US 6,541,384 B1

(12) United States Patent
Sun et al.

(10) Patent No.: US 6,541,384 B1
(45) Date of Patent: Apr. 1, 2003

(54) METHOD OF INITIATING COOPER CMP PROCESS

(75) Inventors: Lizhong Sun, San Jose, CA (US); Stan Tsai, Fremont, CA (US); Shijian Li, San Jose, CA (US); John White, Hayward, CA (US)

(73) Assignee: Applied Materials, Inc., Santa Clara, CA (US)

( * ) Notice: Subject to any disclaimer, the term of this patent is extended or adjusted under 35 U.S.C. 154(b) by 6 days.

(21) Appl. No.: 09/657,391

(22) Filed: Sep. 8, 2000

(51) Int. Cl.⁷ ............... H01L 21/00; C23F 1/00; C09K 13/04
(52) U.S. Cl. ............. 438/692; 156/345.12; 216/38; 216/88; 216/89; 216/100; 216/105; 252/79.2; 252/79.4; 438/693; 438/745; 438/754
(58) Field of Search ............... 438/691, 692, 438/693, 745, 754; 216/38, 88, 89, 91, 100, 105; 156/345 LP, 345.12; 252/79.1, 79.2, 79.4

(56) References Cited

U.S. PATENT DOCUMENTS

| 2,908,557 | A | * | 10/1959 | Black et al. ............ 216/105 X |
| 3,650,957 | A | * | 3/1972 | Shipley et al. ......... 252/79.4 X |
| 4,671,851 | A | | 6/1987 | Beyer et al. ................ 156/645 |
| 5,478,435 | A | | 12/1995 | Murphy et al. ........... 156/636.1 |
| 5,750,440 | A | | 5/1998 | Vanell et al. ............... 438/692 |
| 5,800,577 | A | | 9/1998 | Kido ........................... 51/307 |
| 5,807,165 | A | | 9/1998 | Uzoh et al. |
| 6,001,730 | A | | 12/1999 | Farkas et al. .............. 438/627 |
| 6,027,997 | A | | 2/2000 | Yu et al. ..................... 438/633 |
| 6,063,306 | A | | 5/2000 | Kaufman et al. .......... 252/79.4 |
| 6,066,028 | A | | 5/2000 | Cheng et al. ................. 451/28 |
| 6,068,787 | A | | 5/2000 | Grumbine et al. ......... 252/79.1 |
| 6,309,560 | B1 | * | 10/2001 | Kaufman ............... 252/79.4 X |

FOREIGN PATENT DOCUMENTS

| EP | 0999254 A1 | 10/2000 |
| WO | WO 99/53532 | 10/1999 |

* cited by examiner

Primary Examiner—William A. Powell
(74) Attorney, Agent, or Firm—Townsend and Townsend and Crew

(57) ABSTRACT

The present invention provides a chemical mechanical polishing composition for planarizing copper and a method for planarizing, or initiating the planarization of, copper using the composition. The chemical mechanical polishing composition includes an oxidizing agent and a copper (II) compound. The composition optionally includes one or more of the following compound types: a complexing agent; a corrosion inhibitor; an acid; and, an abrasive. In one embodiment, the oxidizing agent is hydrogen peroxide, ferric nitrate or an iodate. In another embodiment, the copper (II) compound is $CuSO_4$. The chemical mechanical polishing method involves the step of polishing a copper layer using a composition that includes an oxidizing agent and a copper (II) compound. The composition is formed in a variety of ways. In one embodiment, it is formed by adding the copper (II) compound to a solution containing the oxidizing agent, and any included optional compound types, in deionized water. In another embodiment, it is formed by adding a solution containing the copper (II) compound in deionized water to a solution containing the oxidizing agent, and any included optional compound types, in deionized water.

13 Claims, 3 Drawing Sheets

METHOD OF INITIATING COOPER CMP PROCESS

BACKGROUND OF THE INVENTION

The present invention generally relates to metal polishing. In particular, it relates to planarizing copper and/or copper alloy metallization in manufacturing semiconductor devices.

Integrated circuits comprise a plurality of conductive patterns contained in or on layers of a silicon substrate. The conductive patterns include conductive lines, which are separated by dielectric material, and a plurality of interconnect lines. Conductive patterns on different layers are electrically connected by a conductive plug filling a via hole.

The conventional way of forming such conductive patterns has been to first blanket deposit a metal film onto the wafer surface and then etch the metal film using well known etching techniques to form the desired conductive pattern for that layer. Next, a dielectric film is deposited over the etched metal lines and vias are etched in the dielectric film to allow electrical connections for the next layer of metal that is to be deposited onto the dielectric film. This technique requires etching the metal and a deposition process with good gap fill capabilities for both the dielectric and metal layers.

An alternative interconnect fabrication technology, known as the damascene structure, has been developed in which no metal etching is required and in which the gap-filling capability is only required for the metal deposition processes and not for the dielectric deposition process. Metal etching and dielectric gap-fill are viewed as two of the semiconductor industry's greatest challenges in moving to smaller dimension devices. Furthermore, copper, which is becoming the metal of choice for forming the conductive patterns in the next generation of integrated circuits, is notoriously difficult to etch. Accordingly, damascene technology is finding an increased amount of use by semiconductor manufacturers.

One particular method of damascene technology is dual damascene technology. In one approach to using dual damascene technology, an interlayer dielectric layer is deposited over a pattern and then subsequently planarized. Next, trench patterns that define the second conductive layer are formed in the dielectric using known photolithographic and etching techniques. After the trenches are etched, the resist layer used for the formation of the trenches is stripped and a second resist layer is deposited and patterned to define the openings or vias to the underlying conductive layer. The vias are etched, the second resist stripped and metal is deposited to fill the via and trenches. Where the conductive material is a metal, such as copper, the filling process is performed by blanket metal deposition. This deposition process provides excess conductive material on the surface of the dielectric layer that must be removed. Chemical mechanical polishing (CMP) is a typical method used for the removal.

In CMP, a polishing pad is brought into contact with a substrate containing excess material on the dielectric layer. The pad is moved relative to the substrate while pressure is applied against the backside of the substrate. A chemically reactive and oftentimes abrasive chemical composition is provided to the pad during polishing. The chemical composition reacts with the substrate and initiates the polishing process. Polishing is continued until the excess material on the surface is removed.

Various compositions have been proposed in the art for use in CMP. In one method that has been reported to be particularly useful for tungsten polishing, a slurry comprising an oxidizing agent, an abrasive and deionized water is used. The oxidizing agent is either copper sulfate or copper perchlorate, and the slurry pH is maintained between 4 and 6.

Another CMP composition discussed in the art is a slurry comprising an oxidizer, a catalyst and an abrasive in deionized water. The catalyst is typically chosen from metal compounds having multiple oxidation states (e.g. iron, copper and silver), with iron catalysts being preferred. A stabilizing compound can optionally be included in the slurry.

A CMP composition for planarizing metal surfaces, which includes a carboxylic acid, an oxidizing agent and water, has been discussed in the art. Examples of the oxidizing agent include hydrogen peroxide, nitric acid and derivatives of permanganic acid. The carboxylic acid (e.g., malic acid) typically has a molecular weight between 100 and 300. Alkali is used to adjust the composition pH to between 5 and 9. Optionally, the composition can include phosphoric acid and an abrasive.

In a reported method to polish copper, a chemical mechanical polishing composition comprising an oxidizer, an azole and a biodegradable detergent in deionized water or alcohol is used. The oxidizer is typically a compound such as nitric acid or hydrogen peroxide. Exemplary azoles include benzotriazole or its derivatives. The pH of the composition is usually adjusted to be in the 4 to 12 range.

A reported slurry for the chemical mechanical polishing of a copper, copper/tantalum or copper/tantalum nitride containing substrate includes an abrasive, an oxidizing agent, a complexing agent and an organic amino compound. The oxidizing agent is an inorganic or organic percompound. Examples of complexing agents include organic acids such as citric acid and amino acids. Dodecylamine is an exemplary amino compound for the composition. The slurry can optionally contain a film forming agent, such as imidazole, and other additives, such as surfactants, stabilizers and dispersing agents.

While a number of CMP compositions have been discussed in the art, improved chemical compositions are always desirable, especially compositions that are useful for copper planarization.

SUMMARY OF THE INVENTION

The present invention provides a chemical mechanical polishing composition for planarizing copper and a method for planarizing, or initiating the planarization of, copper using the composition.

The chemical mechanical polishing composition includes an oxidizing agent and a copper (II) compound. The composition optionally includes one or more of the following compound types: a complexing agent; a corrosion inhibitor; an acid; and, an abrasive. In one embodiment, the oxidizing agent is hydrogen peroxide, ferric nitrate or an iodate. In another embodiment, the copper (II) compound is $CuSO_4$.

The chemical mechanical polishing method involves the step of polishing a copper layer using a composition that includes an oxidizing agent and a copper (II) compound. The composition is formed in a variety of ways. In one embodiment, it is formed by adding the copper (II) compound to a solution containing the oxidizing agent, and any included optional compound types, in deionized water. In another embodiment, it is formed by adding a solution containing the copper (II) compound in deionized water to a solution containing the oxidizing agent, and any included optional compound types, in deionized water.

These and other embodiments of the present invention, as well as its features and some potential advantages are described in more detail in conjunction with the text below and attached figures.

DESCRIPTION OF THE SPECIFIC EMBODIMENTS

I. Introduction

Figure 1:
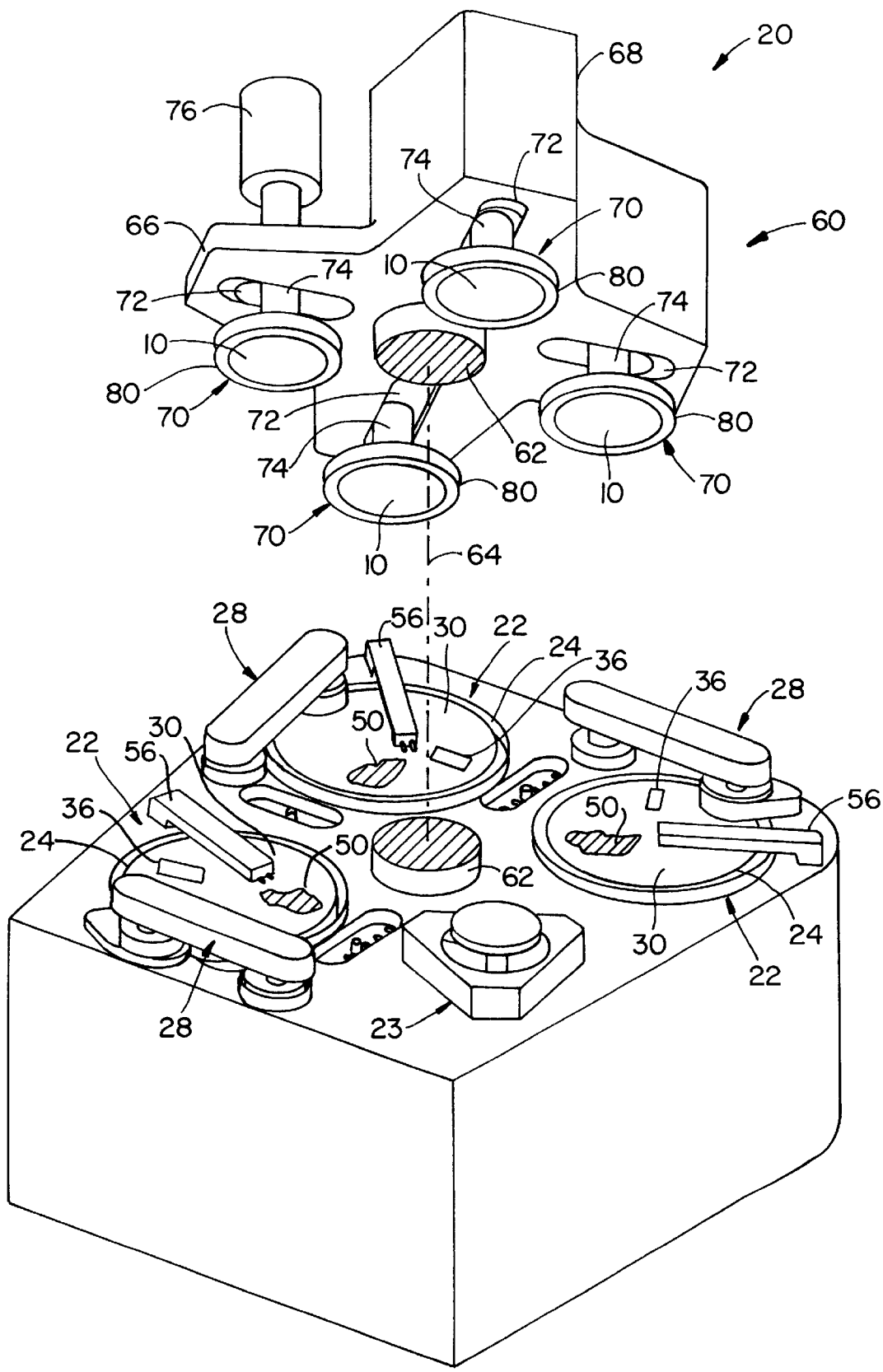
FIG. 1 is an exploded perspective view of a chemical mechanical polishing apparatus.

The present invention allows for the increased throughput of substrates in a copper CMP process ("Copper" in the context of the present invention refers to both copper and copper alloys). In a typical copper CMP process, there is a lag time or "dead period" where polishing does not result in the removal of metal from the substrate surface. The dead period can last for a substantial portion of the process (e.g., 22 seconds out of a one minute process for one particular copper CMP process), thereby significantly slowing down the numbers of substrates that can be polished in a given period of time. The present inventors discovered that the addition of copper ions in the +2 oxidation state (i.e., Cu(II) ions) to a CMP polishing composition greatly reduces the dead period and increases substrate throughput.

II. Copper CMP Polishing Composition

A CMP polishing composition of the present invention is suitable for use in a variety of copper polishing processes, including abrasive-free copper CMP, conventional slurry copper CMP and fixed abrasive copper CMP. The composition comprises an oxidizing agent and a Cu(II) compound in a suitable solvent, such as deionized water. In one embodiment, the composition comprises an oxidizing agent, a Cu(I) compound and a complexing agent. In another embodiment, the composition comprises an oxidizing agent, a Cu(II) compound, a complexing agent and a corrosion inhibitor. One embodiment of the composition includes an oxidizing agent, a Cu(II) compound, a complexing agent, a corrosion inhibitor and an acid.

The Cu(II) compound can be added to the composition in a variety of ways. In one embodiment, the copper (II) compound is added to a solution containing the oxidizing agent and any included optional compound types. In another embodiment, a solution containing the Cu(II) compound is added to a solution containing the oxidizing agent and any included optional compound types.

Where a Cu(II) compound containing solution is added to a solution containing other elements to form the composition, both solutions can be added simultaneously to a polishing pad. In this embodiment, the addition of the Cu(II) compound containing solution can occur during the initial period of (e.g., the first 15 seconds), or throughout the entire period of, the polishing process. Where the Cu(II) compound containing solution is added only during the initial period of the polishing process, the addition of the other solution is continued throughout the polishing process.

Typically, the resulting compositions contain between about 0.01 g/L and 0.5 g/L of Cu(II) compound (e.g., $CuSO_4$) per liter of composition. In one embodiment, the compositions contain between about 0.1 g/L and 0.4 g/L of Cu(II) compound. In another embodiment, the compositions contain between about 0.2 g/L and 0.3 g/L of Cu(II) compound.

Where the Cu(II) compound solution is added directly to the polishing pad, it should be appreciated that the Cu(II) compound solution will contain a greater concentration of Cu(II) compound than the resulting polishing composition. That is because the Cu(II) compound solution is diluted upon contact with the rest of the composition components. For example, if one uses equal volumes of Cu(II) compound solution and a solution containing other composition components, one must add a Cu(II) compound solution containing 0.4 g of Cu(II) compound to achieve a composition with a final Cu(II) compound concentration of 0.2 g/L.

The oxidizing agent contained in the composition of the present invention accelerates metal oxidation, thereby increasing the chemical mechanical polishing rate. The structure of the oxidizing agent is not limited, except that it must be water soluble. Examples of oxidizing agents include the following compounds: hydrogen peroxide; derivatives of permanganic acid, such as potassium permanganate; derivatives of chromic acid, such as sodium chromate; nitric acid and derivatives of nitric acid; derivatives of peroxoacids, such as peroxodisulfuric acid; derivatives of oxoacids, such as perchloric acid; salts of transition metals, such as potassium ferricyanide; and, organic oxidizing agents such as peracetic acid an nitrobenzene. In one embodiment, the oxidizing agent is hydrogen peroxide, ferric nitrate or an iodate. In another embodiment, the oxidizing agent is hydrogen peroxide. Typically, the concentration of the oxidizing agent in the composition is between about 0.5 weight percent and 8.0 weight percent.

The copper compound contained in the copper polishing composition is a Cu(II) based compound. Examples of such Cu(II) compounds, or salts, include $CuSO_4$ (copper sulfate), $Cu(CH_3CO_2)_2$ (copper acetate), $Cu(CH_3COCHC(O)CH_3)_2$ (copper acetylacetonate), $CuCO_3$ (copper carbonate), $Cu(HOCH_2[CH(OH)]_4CO_2)_2$ (copper gluconate, $Cu(NO_3)_2$ (copper nitrate) and $Cu(ClO_4)_2$ (copper perchlorate). In one embodiment, the Cu(II) salt is $CuSO_4$. One of ordinary skill in the art can readily determine a suitable amount of Cu(II) salt for inclusion in the copper polishing composition. Exemplary ranges of Cu(II) salt concentrations are between about 0.01 g/L and 0.5 g/L. In one embodiment, the Cu(II) salt concentration is between about 0.2 g/L and about 0.4 g/L in the composition. In another embodiment, the Cu(II) salt concentration is between about 0.2 g/L and 0.3 g/L in the composition.

The polishing composition of the present invention optionally contains at least one complexing agent. Complexing agents include acids such as citric, lactic, tartaric, succinic and oxalic acid, as well as amino acids, amino sulfuric acids, amines, amides, diamines and alcoholamines. In one embodiment, the complexing agent is ethylenediaminetetraacetic acid, ethylenediamine or methylformamide. Typically, when included, the concentration of the complexing agent in the compositions is between about 0.2 weight percent and about 3.0 weight percent.

Another component that can be added to the polishing composition is a corrosion inhibitor. Corrosion inhibitors include cyclic nitrogen containing compounds such as imidazole, benzotriazole, benzimidazole and benzothiazole. Derivatives of those compounds where the cyclic nitrogen compound is substituted with hydroxy, amino, imino, carboxy, mercapto, nitro and alkyl groups are also included. In one embodiment, the corrosion inhibitor is benzotriazole, mercaptobenzotriazole or 5-methyl-1-benzotriazole.

Typically, when included, the concentration of the corrosion inhibitor in the composition is between about 0.02 weight percent and about 1.0 weight percent.

The polishing composition can also include at least one acid. The acids can be organic or inorganic acids. Where the acid is an organic acid, it is a carboxylic acid. In one embodiment, the acid is acetic acid, phosphoric acid or nitric acid. If included, the acid is typically added to the composition in an amount such that the composition pH is between about 3 and about 10. In one embodiment, the composition has a pH between about 5 and about 8.

Where desired, one can add an abrasive to the polishing composition. The abrasive is typically a metal oxide selected from the group including alumina, titania, zirconia, germania, silica, ceria and mixtures of the oxides. The metal oxide should be of high purity and have a surface area ranging from about 5 $m^2/g$ to about 500 $m^2/g$. When included, abrasive particles are typically incorporated into the composition in a concentration between about 0.1 weight percent and about 40 weight percent.

The solvent for the copper CMP polishing composition is typically deionized water. Components of the composition are dissolved in the solvent. The order in which components are added to the composition can be varied, with suitable addition parameters being readily discernable to one of ordinary skill in the art.

III. Exemplary CMP Polishing Apparatus

Figure 2A:
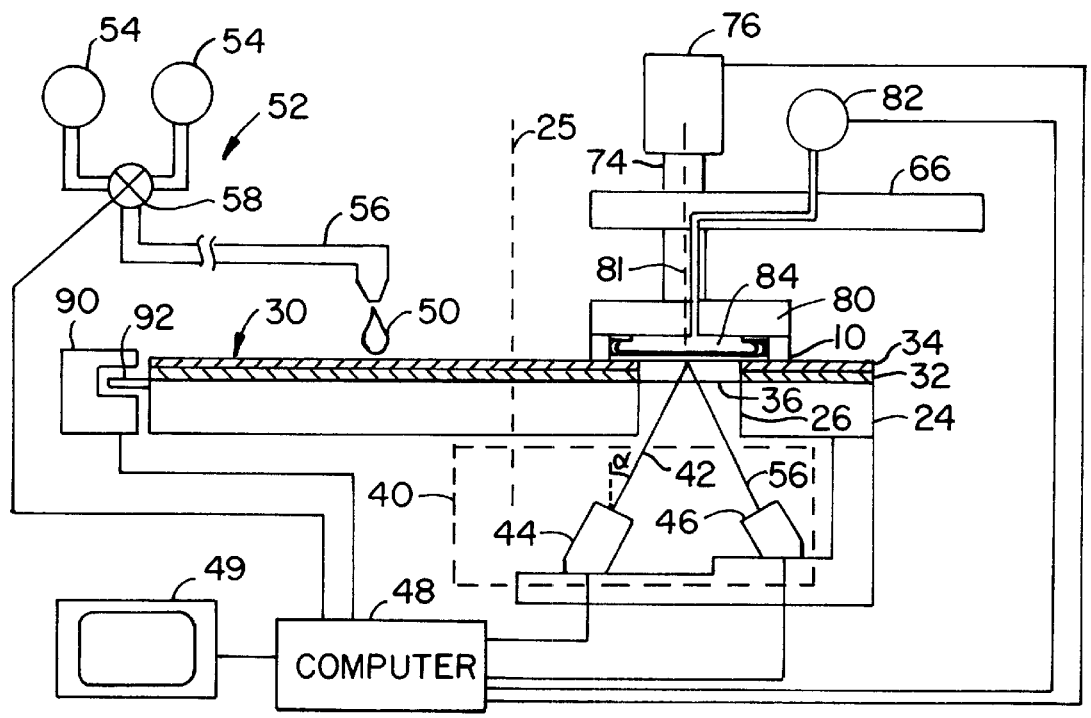
FIG. 2A is a side view of a chemical mechanical polishing apparatus.

A CMP polishing composition of the present invention can be used with any standard CMP apparatus, such as apparatus 20 (FIGS. 1 and 2). In an exemplary process, a substrate is loaded onto a transfer station 23 by a loading apparatus (not shown). The loading apparatus performs multiple functions, including washing the substrate, loading the substrate onto a carrier head, receiving the substrate from the carrier head, washing the substrate again and transferring the substrate back to the loading apparatus.

The transfer station 23 transfers the substrate to one of four carrier head systems 70. A carrier head 80 on a carrier head system 70 holds the substrate against polishing pad 30, which is located on top of a rotatable platen 24. Carrier head 80 evenly distributes a downward pressure across the back surface of the substrate using pressure source 82 and transfers torque from the drive shaft 74 to the substrate.

A CMP polishing composition of the present invention 50 is stored in a polishing composition source 54, which is fluidly connected by a valve 58 to a polishing composition delivery port 56. The polishing composition source 54, valve 58 and delivery port 56 comprise polishing composition supply system 52. Polishing composition 50 is delivered to the surface of the polishing pad 30 by supply system 52.

To polish substrate 10, the platen 24 is rotated about its central axis 25. At the same time, carrier head 80 is rotated about its central axis 81 and translated laterally across the surface of the polishing pad through radial slot 72 formed in carousel support plate 66. An optical monitoring system 40 is used to determine when to halt polishing.

Figure 2B:
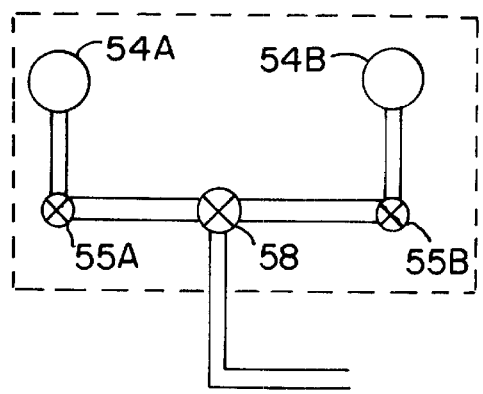
FIG. 2B is a view of a portion of a chemical mechanical polishing apparatus modified to deliver two different solutions to a polishing pad.

The optical monitoring system 40 is secured to platen 24 beneath hole 26. The optical monitoring system includes a light source 44 and a detector 46. The light source generates a light beam 42, which propagates through transparent window 36 and slurry 50 to impinge upon the exposed surface of substrate 10. The light laser beam 42 is projected from laser 44 and detected by detector 46. Computer 48 is programmed to detect the polishing endpoint.

Where a solution of a Cu(II) compound in deionized water is added simultaneously with a solution containing an oxidizing agent and any included optional elements, a slightly different processing procedure is typically used. FIG. 2B shows composition source 54A, which stores a solution containing all composition components except for the Cu(II) compound (first solution). A solution containing Cu(II) compound (second solution) is stored in another composition source 54B. Valve 55A is opened, allowing the flow of the first solution. The second solution is allowed to flow by opening valve 55B. Valve 58 is then opened, providing for the simultaneous addition of the first and second solutions to the surface of the polishing pad. In one embodiment, after a period of time corresponding to a typical polishing dead period (which one of ordinary skill can readily determine), valve 55B is closed while valves 55A and 58 are left open. The polishing process is conducted as described above, with valves 55A and 58 being closed at the end of the process.

IV. Reduction Of Dead Time Using The Present Invention

An embodiment of the CMP polishing composition of the present invention was used to planarize a copper substrate. The polishing composition was prepared by mixing hydrogen peroxide (final concentration approximately 1.5% by volume), benzotriazole (BTA, final concentration approximately 1.5% weight/volume), ethylene diamine EDA, final concentration approximately 1.2% by volume) and phosphoric acid, which was added until the solution pH was approximately 7.0, with varying amounts of $CuSO_4$ in deionized water. The polishing process was conducted in an AMAT Mirra CMP system using the following parameters: polishing pressure of 3 psi; speed of 52/20 (platen/head) rpm; and, a Rodel IC1000 polish pad.

Figure 3:
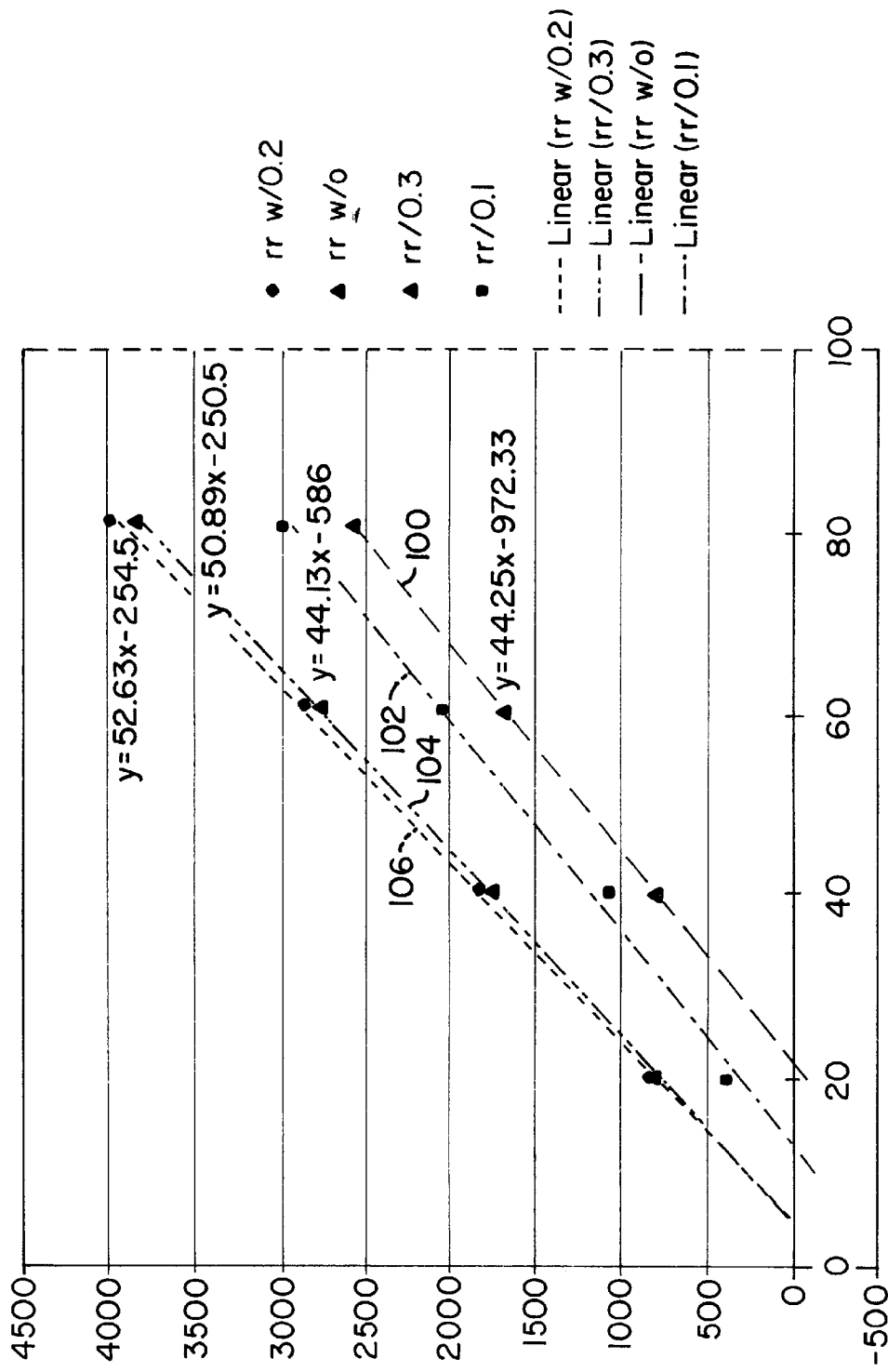
FIG. 3 is a line graph representing four different chemical mechanical polishing experiments.

FIG. 3 is a line graph representing four different chemical mechanical polishing experiments. The x-axis is time in seconds (e.g., 20, 40 and 60 seconds). The y-axis is removal of copper in angstroms (e.g., removal of 2000 angstroms of copper from the substrate). Line 100 represents the rate of copper removal using a composition that did not contain $CuSO_4$ (y=44.25x−972.33). The graph shows that it took approximately 22 seconds for copper removal to begin (i.e., a 22 second dead time). Line 102 represents the rate of copper removal using a second composition containing 0.1 g/L $CuSO_4$ (y=44.13x−586). Dead time was reduced to less than 15 seconds using the second composition. Line 106 represents the rate of copper removal using a third composition containing 0.2 g/L $CuSO_4$ (y=50.89x−250.5), and line 104 represents the rate of copper removal using a fourth composition containing 0.3 g/L CuSO4 (y=52.63x−254.5). Dead time was reduced to around 5 seconds using either the third or fourth composition.

Only certain embodiments of the present invention are shown and described in the present disclosure. One should understand that the present invention is capable of use in various other combinations and environments and is capable of changes and modification within the scope of the inventive concept expressed herein.

While the described embodiments are directed to planarizing a copper surface, one should understand that the same principle can be applied to other metals such as tungsten, aluminum, titanium and tantalum.

What is claimed is:

1. A chemical mechanical polishing composition for planarizing a copper substrate wherein the composition comprises an oxidizing agent and a copper (II) compound, and the composition further comprises a complexing agent.

2. A chemical mechanical polishing composition for planarizing a copper substrate wherein the composition comprises an oxidizing agent, a copper (II) compound in the form of $CuSO_4$, and the composition further comprises a complexing agent, a corrosion inhibitor and an acid.

3. The chemical mechanical polishing composition according to claim 2, wherein the oxidizing agent is hydrogen peroxide, and wherein the complexing agent is ethylene diamine, and wherein the corrosion inhibitor is benzotriazole.

4. The chemical mechanical polishing composition according to claim 3, wherein the $CuSO_4$ concentration in the composition is between 0.1 g/L and 0.4 g/L.

5. The chemical mechanical polishing composition according to claim 4, wherein the composition further comprises an abrasive, and wherein the abrasive is alumina or silica.

6. A method for planarizing copper comprising the step of polishing a copper layer using a composition comprising an oxidizing agent, a complexing agent, and a copper (II) compound in deionized water, wherein the composition is formed by adding the copper (II) compound to a solution comprising the oxidizing agent in deionized water.

7. A method for planarizing copper comprising the step of polishing a copper layer using a composition comprising an oxidizing agent, a complexing agent, and a copper (II) compound in deionized water, wherein the composition is formed by simultaneously delivering a first solution containing copper (II) compound and a second solution comprising the oxidizing agent to a polishing pad in a chemical mechanical polishing apparatus.

8. The method according to claim 6, wherein the copper (II) compound is $CuSO_4$.

9. The method according to claim 7, wherein the delivery of the first and second solutions is continued throughout the planarizing process.

10. The method according to claim 7, wherein the delivery of the first solution is stopped during the planarizing process, and wherein the delivery of the second solution is continued throughout the planarizing process.

11. The method according to claim 8, wherein the oxidizing agent is hydrogen peroxide, ferric nitrate or an iodate.

12. The method according to claim 11, wherein the composition further comprises a corrosion inhibitor and an acid.

13. The method according to claim 12, wherein the oxidizing agent is hydrogen peroxide, and wherein the complexing agent is ethylene diamine, and wherein the corrosion inhibitor is benzotriazole.

* * * * *